United States Patent
Liang

(10) Patent No.: US 10,805,380 B2
(45) Date of Patent: Oct. 13, 2020

(54) DATA TRANSMISSION METHOD AND DEVICE

(71) Applicant: Tencent Technology (Shenzhen) Company Limited, Shenzhen (CN)

(72) Inventor: Yuxuan Liang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 16/433,897

(22) Filed: Jun. 6, 2019

(65) Prior Publication Data

US 2019/0349417 A1 Nov. 14, 2019

Related U.S. Application Data

(63) Continuation of application No. PCT/CN2017/115623, filed on Dec. 12, 2017.

(30) Foreign Application Priority Data

Jan. 3, 2017 (CN) .......................... 2017 1 0002152

(51) Int. Cl.
  *H04L 29/08* (2006.01)
  *H04L 29/06* (2006.01)
(52) U.S. Cl.
  CPC .......... *H04L 67/06* (2013.01); *H04L 63/0807* (2013.01); *H04L 67/1074* (2013.01); *H04L 67/303* (2013.01); *H04L 67/42* (2013.01)
(58) Field of Classification Search
  CPC . H04L 63/0807; H04L 67/06; H04L 67/1074; H04L 67/303; H04L 67/42
  See application file for complete search history.

(56) References Cited

U.S. PATENT DOCUMENTS 7,194,689 B2   3/2007   Manni et al.
7,603,266 B2   10/2009   Ramanathan
(Continued)

FOREIGN PATENT DOCUMENTS

CN   1882055 A      12/2006
CN   101334932 A    12/2008
CN   103517116 A    1/2014

OTHER PUBLICATIONS

Tencent Technology, ISRWO, PCT/CN2017/115623, Mar. 2, 2018, 6 pgs.

(Continued)

*Primary Examiner* — Jerry B Dennison
(74) *Attorney, Agent, or Firm* — Morgan, Lewis & Bockius LLP

(57) ABSTRACT

Embodiments of the present disclosure provide a data transmission method performed at a server. The server presets logic response files corresponding to identity types. A target terminal may obtain a target logic response file corresponding to an identity type of the target terminal from the server. The target logic response file includes response information to control instructions sent by a peer device and a correspondence between input information and a control instruction to send to the peer device. Because the response information is used for indicating an operation performed in response to the corresponding control instruction, and the input information is used for controlling the peer device, the target terminal can respond to the control instructions of the peer device through the target logic response file and generate a control instruction for controlling the peer device through the target logic response file, to achieve bidirectional communication between devices.

20 Claims, 5 Drawing Sheets

(56) References Cited

U.S. PATENT DOCUMENTS

| | | | | |
|---|---|---|---|---|
| 9,519,772 B2* | 12/2016 | Harrison | ............... | G06F 16/951 |
| 10,623,450 B2* | 4/2020 | Murphy | ............... | H04L 63/029 |
| 2015/0113621 A1* | 4/2015 | Glickfield | ............. | H04W 12/06 |
| | | | | 726/7 |
| 2019/0349417 A1* | 11/2019 | Liang | ................. | H04L 67/2814 |

OTHER PUBLICATIONS

Tencent Technology, IPRP, PCT/CN2017/115623, Jul. 9, 2019, 5 pgs.

* cited by examiner

DATA TRANSMISSION METHOD AND DEVICE

CROSS-REFERENCE TO RELATED APPLICATIONS

The application is a continuation application of PCT/CN2017/115623, entitled "DATA TRANSMISSION METHOD AND APPARATUS" filed on Dec. 12, 2017, which claims priority to China Patent Application No. 201710002152.9, filed with the Chinese Patent Office on Jan. 3, 2017 and entitled "DATA TRANSMISSION METHOD AND APPARATUS", all of which are incorporated by reference in their entireties.

FIELD OF THE TECHNOLOGY

Embodiments of this application relates to the field of communications technologies, and more specifically, to a data transmission method and apparatus.

BACKGROUND OF THE DISCLOSURE

With the development of electronic devices, devices such as personal computers, tablet computers, smartphones, and smart televisions are becoming more popular. Technologies of using a plurality of devices for communication emerge accordingly. Communication between a plurality of devices is described below by using an example in which a smartphone remotely controls a smart television.

The smartphone, used as a control terminal, generates a control instruction and sends the control instruction to a server, the server sends the control instruction to the smart television, and the smart television, used as a presentation terminal, responds to the control instruction and displays a corresponding interface.

In conclusion, the communication between a plurality of devices in the existing technology is unidirectional. For example, the smartphone sends the control instruction to the smart television, and the smart television cannot send information to the smartphone, that is, bidirectional communication cannot be implemented.

SUMMARY

In view of the above, the present disclosure discloses a data transmission method and apparatus, to overcome a problem in the existing technology that a plurality of devices cannot implement bidirectional communication.

To achieve the foregoing objective, the present disclosure provides the following technical solutions:

A data transmission method is performed at a server having one or more processors and memory storing a plurality of programs to be executed by the one or more processors, the method comprising:

receiving identity token information sent by a target terminal, the identity token information being used for representing an identity type of the target terminal when the target terminal interacts with a peer device, the identity type being used for indicating that the target terminal is a control terminal or a presentation terminal;

determining a target logic response file corresponding to the identity type of the target terminal in logic response files corresponding to identity types, the target logic response file including response information corresponding to control instructions sent by the peer device and a correspondence between input information and a control instruction that the target terminal needs to send to the peer device, the response information being used for indicating an operation performed in response to the corresponding control instruction, and the input information being information received by the target terminal and used for controlling the peer device; and sending the target logic response file to the target terminal.

A server comprises one or more processors, memory, and a plurality of machine readable instructions stored in the memory. The plurality of machine readable instructions, when executed by the one or more processors, cause the server to perform the aforementioned data transmission method.

A non-transitory computer readable storage medium storing a plurality of machine readable instructions in connection with a server having one or more processors, wherein the plurality of machine readable instructions, when executed by the one or more processors, cause the server to perform the aforementioned data transmission method.

It can be known from the foregoing technical solutions that compared with the existing technology, the embodiments of the present disclosure provide a data transmission method. A server presets logic response files corresponding to identity types. A target terminal may obtain a target logic response file corresponding to an identity type of the target terminal from the server. The target logic response file includes response information corresponding to control instructions sent by a peer device and a correspondence between input information and a control instruction that the target terminal needs to send to the peer device. Because the response information is used for indicating an operation performed in response to the corresponding control instruction, and the input information is information received by the target terminal and used for controlling the peer device, the target terminal, whether used as a control terminal or as a presentation terminal, can respond to the control instructions of the peer device through the target logic response file and generate a control instruction for controlling the peer device through the target logic response file, to achieve bidirectional communication between a plurality of devices.

BRIEF DESCRIPTION OF THE DRAWINGS

To describe the technical solutions in the embodiments of the present disclosure or in the existing technology more clearly, the following briefly describes the accompanying drawings required for describing the embodiments or the existing technology. Apparently, the accompanying drawings in the following description show merely some embodiments of the present disclosure, and a person of ordinary skill in the art may still derive other drawings from these provided accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Obviously, the described embodiments are only some embodiments instead of all embodiments of the present disclosure. All other embodiments obtained by a person of ordinary skill in the art according to the embodiments of the present disclosure without creative effects shall fall within the protection scope of the present disclosure.

Figure 1:
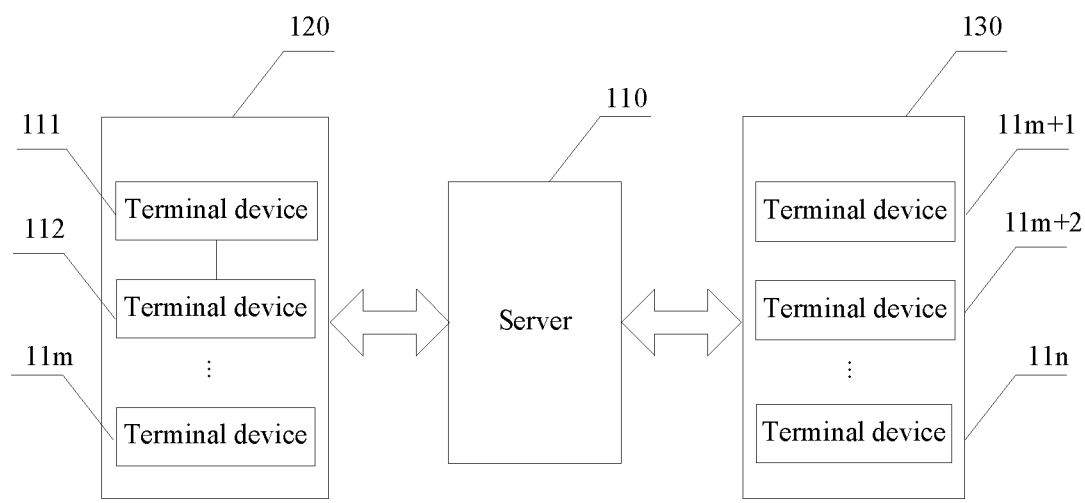
FIG. 1 is a schematic structural diagram of a data transmission system according to an embodiment of this application.

A data transmission method provided in an embodiment of this application may be applied to a data transmission system. As shown in FIG. 1, FIG. 1 is a schematic structural diagram of a data transmission system according to an embodiment of this application. The data transmission system includes: a server 110 and a plurality of terminal devices 111 to 11n, n is a positive integer greater than or equal to 2, and m in FIG. 1 is a positive integer greater than or equal to 1 and smaller than or equal to n.

The plurality of terminal devices 111 to 11n corresponds to two identity types, respectively, a control terminal and a presentation terminal. Terminal devices located in an area 120 in FIG. 1 are all control terminals, and terminal devices located in an area 130 are all presentation terminals.

A terminal device used as a control terminal may send a control instruction to a terminal device used as a presentation terminal through the server 110, and the terminal device used as a presentation terminal may also send a control instruction to the terminal device used as a control terminal through the server 110, to implement bidirectional communication between a plurality of terminal devices.

The data transmission method provided in this embodiment of this application is described below with reference to FIG. 1.

Figure 2:
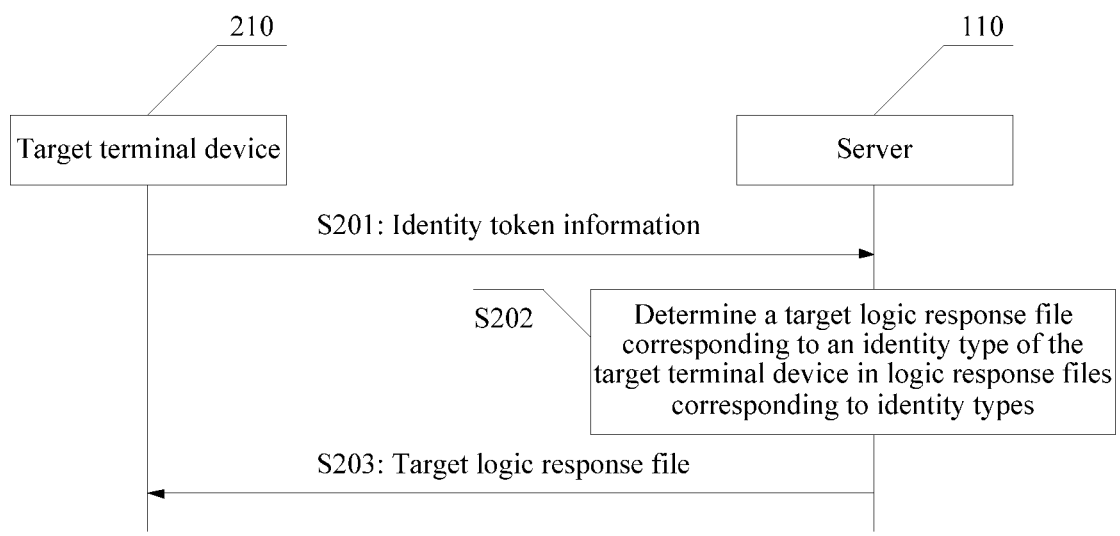
FIG. 2 is a signaling flowchart of a data transmission method according to an embodiment of this application.

As shown in FIG. 2, FIG. 2 is a signaling flowchart of a data transmission method according to an embodiment of this application. The method includes the following steps:

Step S201: A target terminal 210 sends identity token information to a server 110.

The identity token information is used for representing an identity type of the target terminal when the target terminal interacts with a peer device, and the identity type is used for indicating that the target terminal is a control terminal or a presentation terminal.

The target terminal 210 may be a control terminal shown in FIG. 1 or may be a presentation terminal shown in FIG. 1. Therefore, signs of the terminal devices in FIG. 1 cannot be used to mark the target terminal. Therefore, 210 is used for the target terminal. If the target terminal 210 is a control terminal, the peer device is a presentation terminal. If the target terminal 210 is a presentation terminal, the peer device is a control terminal.

A user may open a browser in the target terminal 210 and access the server 110 through the browser. The server 110 may return an identity type selection interface to the target terminal 210. The user may select the identity type of the target terminal 210 through the identity type selection interface displayed in the browser in the target terminal 210, to generate corresponding identity token information.

For example, a control terminal key and a presentation terminal key are displayed in the identity selection interface displayed in the browser. When the user touches and presses the control terminal key, the generated identity token information represents that the target terminal is a control terminal. When the user touches and presses the presentation terminal key, the generated identity token information represents that the target terminal is a presentation terminal.

The user may also directly input a link in the browser. The link includes an Internet protocol (IP) address and port of the server. The server may provide different ports to different identity types.

The identity token information may be the link.

For example, a port corresponding to the control terminal may be a port 80, and a port corresponding to the presentation terminal may be a port 102.

Step S202: The server 110 receives the identity token information sent by the target terminal 210 and determines a target logic response file corresponding to an identity type of the target terminal 210 in logic response files corresponding to identity types.

The target logic response file includes response information corresponding to control instructions sent by the peer device and a correspondence between input information and a control instruction that the target terminal needs to send to the peer device, the response information is used for indicating an operation performed in response to the corresponding control instruction, and the input information is information received by the target terminal and used for controlling the peer device.

The "correspondence between input information and a control instruction that the target terminal needs to send to the peer device" may be: information, such as voice information and text information, that is input by the user in an operation interface displayed in the target terminal, or information about touching and pressing of a target button (the button may be a physical button or a vertical button) that is input by the user by touching and pressing the target button in the operation interface displayed in the target terminal, or information about a touched and pressed location that is input by the user by touching and pressing the operation interface displayed in the target terminal.

Using an example in which the input information is the information about touching and pressing of a target button, the target logic response file is described. The target logic response file may include character strings corresponding to buttons in the operation interface displayed in the target terminal. After inputting the information about touching and pressing of a target button, the user may determine a target character string corresponding to the target button according to the character strings corresponding to the buttons. The target terminal may generate a corresponding control instruction according to the target character string. In this case, the "response information corresponding to control instructions sent by the peer device" included in the target logic response file is response information corresponding to the character strings corresponding to the buttons in the operation interface displayed by the peer device.

The determining a target logic response file corresponding to the identity type of the target terminal in logic response files corresponding to identity types may include: determining a target port corresponding to the identity type of the target terminal in prestored ports corresponding to the identity types; and obtaining the target logic response file through the target port.

Step S203: The server 110 sends the target logic response file to the target terminal 210.

Optionally, after the target terminal 210 receives the target logic response file, if the target terminal 210 is a control terminal, an operation interface corresponding to the control terminal is displayed. If the target terminal 210 is a presentation terminal, an operation interface corresponding to the presentation terminal is displayed, for the user to perform an operation through the operation interface displayed by the target terminal 210, for example, enter input information for controlling the peer device.

In this embodiment of this application, when the target terminal is a control terminal, the peer device is a presentation terminal; when the target terminal is a presentation terminal, the peer device is a control terminal. That is, in this embodiment of this application, the target terminal used as the presentation terminal may have a function of controlling a peer terminal.

In the data transmission method provided in this embodiment of the present disclosure, the server presets logic response files corresponding to identity types. A target terminal may obtain a target logic response file corresponding to an identity type of the target terminal from the server. The target logic response file includes response information corresponding to control instructions sent by a peer device and a correspondence between input information and a control instruction that the target terminal needs to send to the peer device. Because the response information is used for indicating an operation performed in response to the corresponding control instruction, and the input information is information received by the target terminal and used for controlling the peer device, the target terminal, whether used as a control terminal or as a presentation terminal, can respond to the control instructions of the peer device through the target logic response file and generate a control instruction for controlling the peer device through the target logic response file, to achieve bidirectional communication between a plurality of devices.

A process of obtaining, by the peer device 310, a logic response file corresponding to an identity type of the peer device 310 from the server is the same as the process shown in FIG. 2 and is not described in detail herein again.

Figure 3:
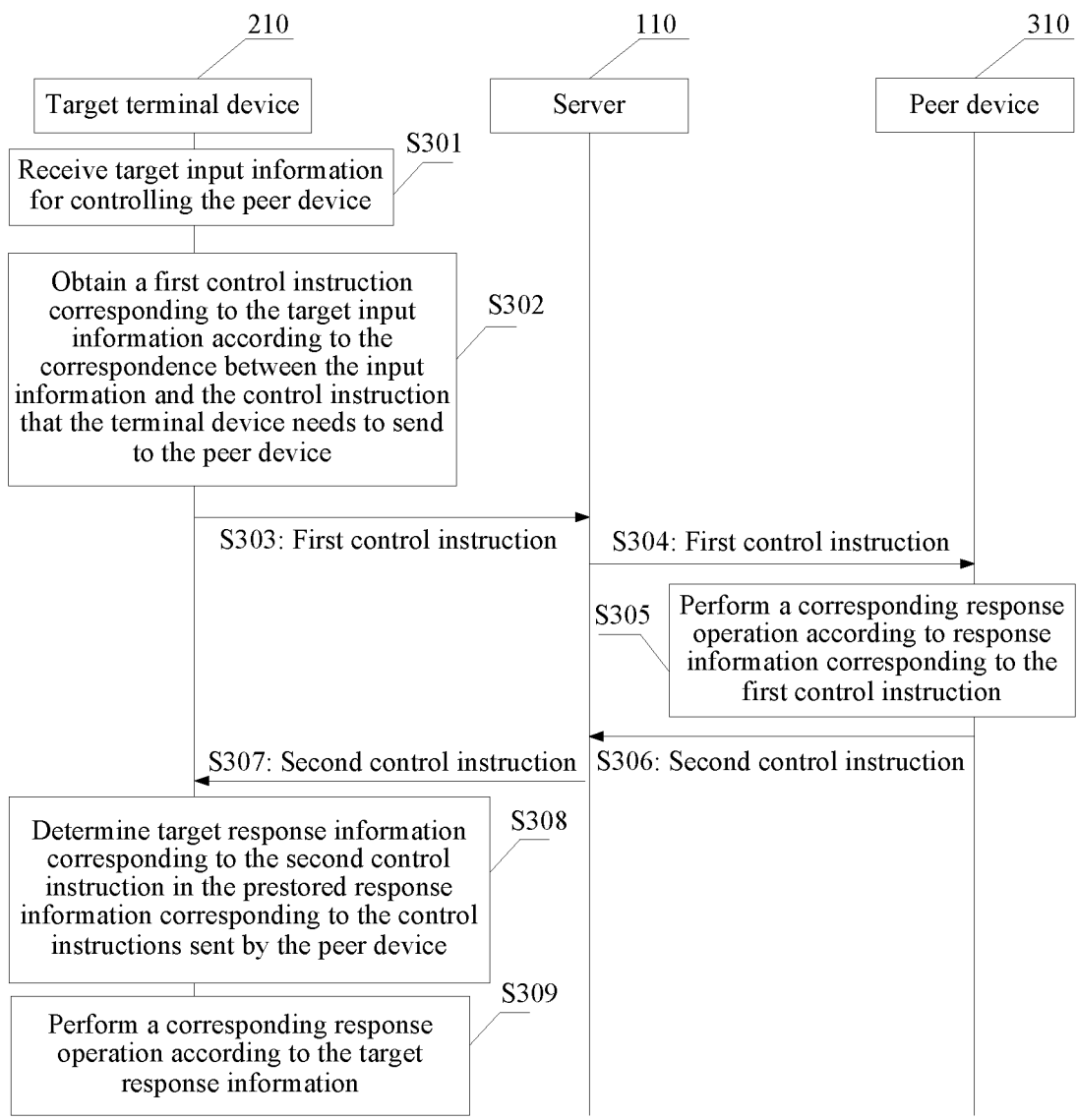
FIG. 3 is a signaling flowchart of performing bidirectional communication by a target terminal and a peer device according to an embodiment of this application.

After both obtaining corresponding logic response files from the server 110, the target terminal 210 and the peer device 310 may perform bidirectional communication. As shown in FIG. 3, FIG. 3 is a signaling flowchart of performing bidirectional communication by a target terminal and a peer device according to an embodiment of this application. A specific process includes the following steps:

Step S301: The target terminal 210 receives target input information for controlling the peer device.

For detailed descriptions of the target input information, refer to related descriptions of step S202 in the process shown in FIG. 2. The detailed descriptions are not provided herein again.

Step S302: The target terminal 210 obtains a first control instruction corresponding to the target input information according to the correspondence between the input information and the control instruction that the terminal device needs to send to the peer device.

The first control instruction carries communication address information of the peer device.

The communication address information may be an Internet Protocol (IP) address or a Media Access Control (MAC) address between networks of the peer device 310.

If the user logs in to the peer device 310, the communication address information may also be a username and/or user password of the user that logs in to the peer device 310.

Step S303: The target terminal 210 sends the first control instruction to the server 110.

Step S304: The server 110 sends the first control instruction to the peer device 310.

Step S305: The peer device 310 responds to the first control instruction according to a logic response file corresponding to an identity type of the peer device 310.

It may be understood that the target terminal and the peer device are relative. A peer device of the target terminal 210 is a peer device 310, and a peer device of the peer device 310 is the target terminal 210. Therefore, the logic response file corresponding to the identity type of the peer device 310 includes: response information corresponding to control instructions sent by the target terminal 210 and a correspondence between input information and a control instruction that the peer device 310 needs to send to the target terminal 210, the response information being used for indicating an operation performed in response to the corresponding control instruction, and the input information being information received by the peer terminal and used for controlling the target terminal. That is, locations of "the peer device 310" and "the target terminal 210" in content included in the target logic response file are exchanged. That is, the logic response file is the logic response file corresponding to the identity type of the peer device 310.

Step S305 may include:

determining, by the peer device 310, response information corresponding to the first control instruction in the prestored response information corresponding to the control instructions sent by the target terminal 210; and performing a corresponding response operation according to the response information corresponding to the first control instruction.

The step of "performing a corresponding response operation according to the response information corresponding to the first control instruction" may include returning, to the target terminal 210 through the server 110, a message indicating that a response to the first control instruction is already made.

Step S306: The peer device 310 sends a second control instruction to the server 110.

A method for generating the second control instruction by the peer device 310 is the same as a process of generating the first control instruction by the target terminal 210 and may specifically include:

receiving, by the peer device 310, input information for controlling the target terminal 210; and obtaining, by the peer device 310 according to the correspondence between the input information included in the logic response file corresponding to the identity type of the peer device 310 and a control instruction that a device of the peer terminal 310 needs to send to the target terminal, the second control instruction corresponding to the input information received by the peer device 310.

The second control instruction carries communication address information of the target terminal.

The communication address information may be an IP address or a MAC address of the target terminal 210.

If the user logs in to the target terminal 210, the communication address information may also be a username and/or user password of the user that logs in to the target terminal 210.

Step S307: The server 110 sends the second control instruction to the target terminal 210.

Step S308: The target terminal 210 determines target response information corresponding to the second control instruction in the prestored response information corresponding to the control instructions sent by the peer device.

Step S309: The target terminal 210 performs a corresponding response operation according to the target response information.

Step S309 may include returning, to the peer device 310 through the server 110, a message that a response to the second control instruction is already made.

That the target terminal 210 performs the corresponding response operation according to the target response information may include generating an operation interface currently displayed in the target terminal 210. Similarly, that the peer device 310 "performs a corresponding response operation according to the response information corresponding to the first control instruction" may include generating an operation interface currently displayed in the peer device 310. Descriptions are provided below by using the target terminal 210 as an example.

Figure 4:
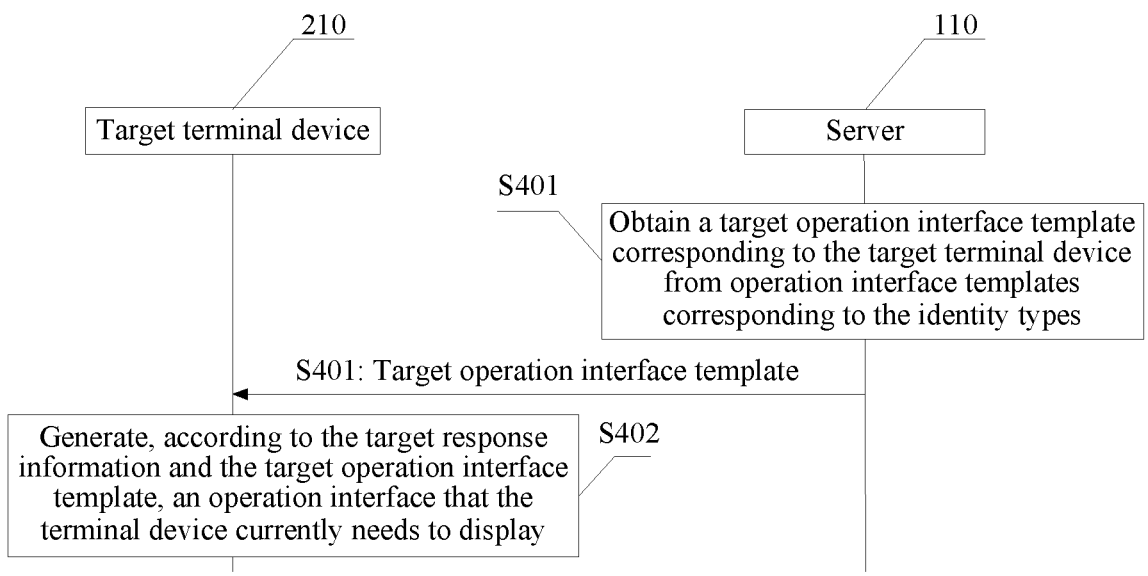
FIG. 4 is a signaling flowchart of an operation interface generation method of a target terminal in a data transmission method according to an embodiment of this application.

As shown in FIG. 4, FIG. 4 is a signaling flowchart of an operation interface generation method of a target terminal in a data transmission method according to an embodiment of this application. The method includes the following steps:

Step S401: The server 110 obtains a target operation interface template corresponding to the target terminal from operation interface templates corresponding to the identity types, and sends the target operation interface template to the target terminal 210.

Step S402: The target terminal 210 generates, according to the target response information and the target operation interface template, an operation interface that the terminal device currently needs to display.

The target response information may be obtained by the process shown in FIG. 3.

Optionally, step S402 may specifically include: generating, based on a prestored reveal.js file according to the target response code and the target operation interface template, the operation interface currently displayed by the target terminal.

The reveal.js file may store pattern information of the operation interface, for example, location information of content displayed in the operation interface, location information of buttons in the operation interface, size information of the buttons, and location information of input boxes.

Figure 5:
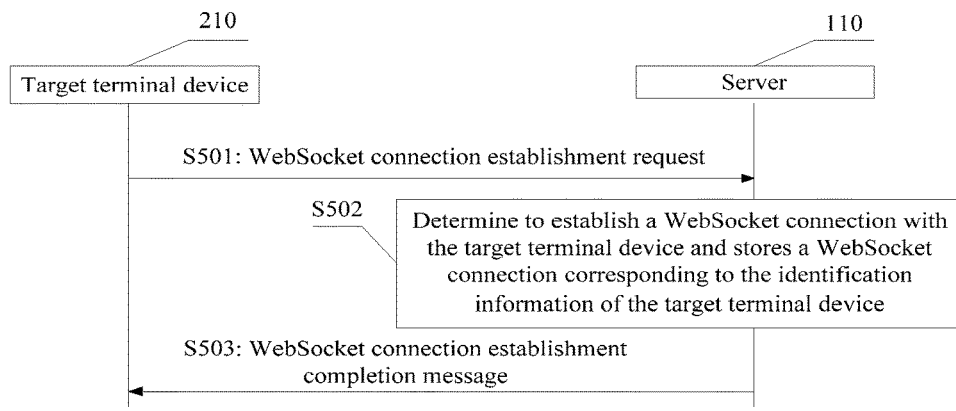
FIG. 5 is a signaling flowchart of establishing a WebSocket connection by a target terminal and a server according to an embodiment of this application.

To accelerate communication between the terminal devices and the server shown in FIG. 1, a WebSocket connection may be established between the terminal devices and the server. The process is described below by using the target terminal as an example. As shown in FIG. 5, FIG. 5 is a signaling flowchart of establishing a WebSocket connection by a target terminal and a server according to an embodiment of this application. The method includes the following steps:

Step S501: A target terminal 210 sends a WebSocket connection establishment request to a server 110.

The WebSocket connection establishment request carries identification information of the target terminal.

WebSocket is a network technology for performing full duplex communication between a browser and a server in a terminal device and provided by HyperText Markup Language (HTML) 5, and WebSocket is based on a full duplex communication protocol based on a transmission control protocol (TCP). In a WebSocket application programming interface (API), the browser and the server need to perform only an action of handshaking. Then, a fast channel is formed between the browser and the server in the terminal device. Data between the browser and the server may be mutually directly transferred. A WebSocket protocol can better save server resources and bandwidth and achieve real-time communication.

Step S502: The server 110 determines to establish a WebSocket connection with the target terminal 210 and stores a WebSocket connection corresponding to the identification information of the target terminal, the WebSocket connection being a channel over which the target terminal and a server perform information exchange.

Because the server 110 may establish a WebSocket connection with a plurality of terminal devices, to recognize WebSocket connections corresponding to the terminal devices, WebSocket connections corresponding to identifiers ID of the terminal devices need to be bound and stored.

An identifier ID of the target terminal may be a username of a user that logs in to the target terminal, and/or an IP address of the target terminal, and/or a MAC address of the target terminal.

Correspondingly, the communication address information of the peer device carried in the first control instruction in FIG. 3 may be identification information of the peer device, or the communication address information of the peer device is associated with identification information of the peer device. The communication address information of the target terminal carried in the second control instruction may be the identification information of the target terminal, or a communication address of the target terminal is associated with the identification information of the target terminal. That is, the server 110 in FIG. 3 may obtain the identification information of the target terminal through the communication address information of the peer device, to determine a WebSocket connection corresponding to the identification information of the peer device, to send the first control instruction to the peer device through the WebSocket connection corresponding to the identification information of the peer device.

Similarly, the server 110 in FIG. 3 may obtain the identification information of the target terminal through the communication address information of the target terminal, to determine a WebSocket connection corresponding to the identification information of the target terminal, to send the second control instruction to the target terminal through the WebSocket connection corresponding to the identification information of the target terminal.

Optionally, a specific implementation process of step S502 may include: the user may input a username and a password in an operation interface displayed in the browser on the target terminal 210, and after the user inputs the username and the password and clicks a login key, the username and the user password are sent to the server 110. The server 110 performs authentication according to the username and the user password, and only after authentication is passed, determines to establish the WebSocket connection with the target terminal 210.

An authentication method of the server 110 is described by using the game "Call of Duty Online" as an example. Because teams may be formed in the game "Call of Duty Online", there is a plurality of players in each group, terminal devices corresponding to the plurality of players may perform interaction shown in FIG. 3, and the server may store usernames of members corresponding to identifiers of groups. If the server receives the WebSocket connection establishment request sent by the target terminal, and the WebSocket connection establishment request carries a target identifier and a target username of a target group, the server determines a username corresponding to the target identifier in usernames corresponding to identifiers stored in the server. If the username corresponding to the target identifier includes the target username, it is determined to establish a WebSocket connection with the target terminal. If the username corresponding to the target identifier does not include the target username, a WebSocket connection is not established with the target terminal.

Step S503: The server 110 returns a WebSocket connection establishment completion message to the target terminal.

Figure 6:
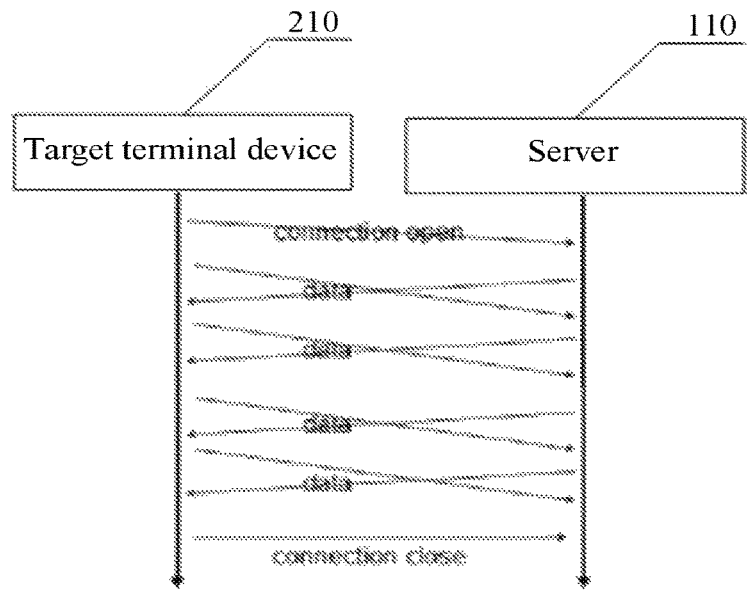
FIG. 6 is an interaction diagram of a WebSocket request response target terminal and a server according to an embodiment of this application.

As shown in FIG. 6, FIG. 6 is an interaction diagram of a target terminal and a server according to an embodiment of this application.

"connection open" shown in FIG. 6 indicates successful establishment of the WebSocket connection between the target terminal and the server, and "connection close" indicates disconnection of the WebSocket connection between the target terminal and the server. "data" is data exchanged between the target terminal 210 and the server 110. The data includes the first control instruction, the second control instruction, the target logic response file, the target operation interface template, and the like.

WebSocket is a communication mode similar to transmission control protocol TCP) long connection of Socket. Once the WebSocket connection is established, subsequent data is transmitted in a form of a frame sequence. Before the target terminal disconnects the WebSocket connection or the server disconnects the WebSocket connection, the target terminal and the server do not need to initiate a connection request again. In the case of massive concurrency and large interactive load flows of the target device and the server, consumption of network bandwidth resources is greatly saved, a prominent performance advantage is provided, and the target terminal sends and receives messages on the same persistent connection, providing a prominent real-time advantage.

Figure 7:
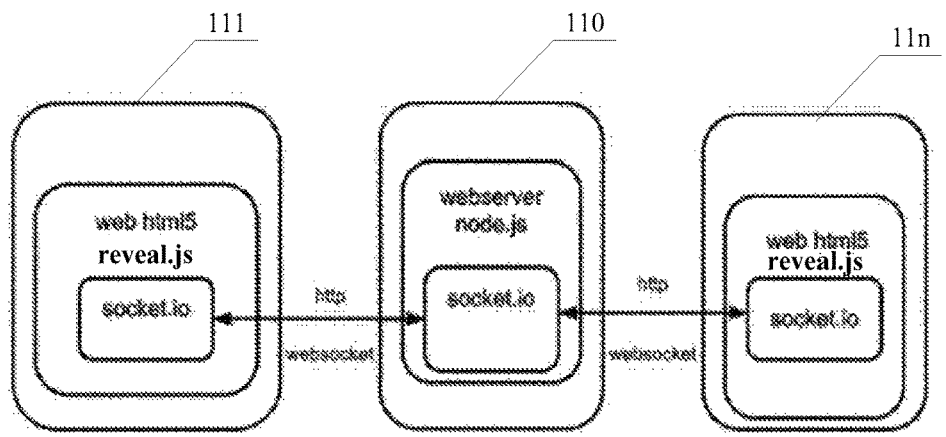
FIG. 7 is a schematic framework diagram of the terminal devices and the server in FIG. 1 according to an embodiment of this application.

The server 110 may set up an Express server based on Node.js, and a Socket.io plug-in is mounted on the server 110. As shown in FIG. 7, FIG. 7 is a schematic framework diagram of the terminal devices and the server in FIG. 1 according to an embodiment of this application.

Only one terminal device 111 located in an area 120 and one terminal device 11n located in an area 130 are shown in FIG. 7. Frameworks of other terminal devices located in the area 120 are the same as a framework of the terminal device 111, and frameworks of other terminal devices located in the area 130 are the same as a framework of the terminal device 11n.

Optionally, the terminal devices in FIG. 7 may further include a reveal.js file.

The Socket.io plug-in is a specific implementation of the WebSocket protocol by using the JavaScript language, and by means of Socket.io, the server and the terminal device may more conveniently use the WebSocket protocol for bidirectional communication. Socket.io mounted by the server is integrated into Node.js as an extended plug-in of Node.js and is used in the terminal device by being introduced into a Node.js class library of Socket.io.

Node.js is an event driven I/O server-side JavaScript environment based on Google V8 engine. Node.js aims to provide an extensible network writing program, such as a Web service.

Express is an extremely simple and flexible web application development framework based on a Node.js platform.

The target terminal 210 may also send a login status of the target terminal 210 to the server 110. The login status may include the communication address information of the peer device 310, and the server 110 may send the login status to the peer device 310.

The login status may include a logged-in state and a logged-out state. The logged-in state includes an online state, and the logged-out state includes an offline state.

If there is a plurality of target terminals 210, that the server 110 sends the login status to the peer device 310 includes: calculating the number of target terminals in the logged-in state according to the login statuses corresponding to the target terminals; and sending the login statuses corresponding to the target terminals and the number of target terminals in the logged-in state to the peer device.

For example, on a release site of the game "Call of Duty Online", on-site online players need to be counted. In this case, a large screen on the release site may be used as a presentation terminal to display login statuses corresponding to terminal devices and the number of terminal devices in a logged-in state.

Using the game "Call of Duty Online" as an example, the logged-out state may mean that a terminal device does not display an interface related to the game "Call of Duty Online". The logged-in state may means that a terminal device displays an interface related to the game "Call of Duty Online".

A data transmission apparatus corresponding to the foregoing data transmission method is described below. Cross references are made for the same parts.

Figure 8:
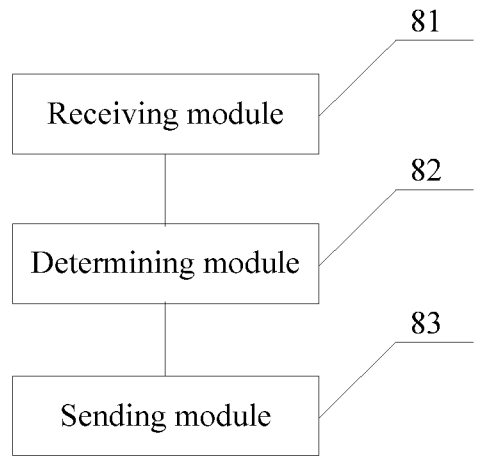
FIG. 8 is a schematic structural diagram of a data transmission apparatus applied to a server according to an embodiment of this application.

As shown in FIG. 8, FIG. 8 is a schematic structural diagram of a data transmission apparatus applied to a server according to an embodiment of this application. The apparatus includes a receiving module 81, a determining module 82, and a sending module 83.

The receiving module 81 is configured to receive identity token information sent by a target terminal, the identity token information being used for representing an identity type of the target terminal when the target terminal interacts with a peer device, the identity type being used for indicating that the target terminal is a control terminal or a presentation terminal.

The determining module 82 is configured to determine a target logic response file corresponding to the identity type of the target terminal in prestored logic response files corresponding to identity types.

The target logic response file includes response information corresponding to control instructions sent by the peer device and a correspondence between input information and a control instruction that the target terminal needs to send to the peer device, the response information is used for indicating an operation performed in response to the corresponding control instruction, and the input information is information received by the target terminal and used for controlling the peer device.

The sending module 83 is configured to send the target logic response file to the target terminal.

Optionally, the determining module 82 in the data transmission apparatus embodiment applied to the server includes:

a first determining unit, configured to determine a target port corresponding to the identity type of the target terminal in prestored ports corresponding to the identity types; and a second determining unit, configured to obtain the target logic response file through the target port.

Optionally, the data transmission apparatus embodiment applied to the server further includes:

a second receiving module, configured to receive a first control instruction sent by the target terminal, the first control instruction carrying communication address information of the peer device; and a second sending module, configured to send the first control instruction to the peer device according to the communication address information of the peer device, so that the peer device responds to the first control instruction according to a logic response file corresponding to an identity type of the peer device.

Optionally, the data transmission apparatus embodiment applied to the server further includes:

a third receiving module, configured to receive a second control instruction sent by the peer device, the second control instruction carrying communication address information of the target terminal, and the second control instruction being generated according to a logic response file corresponding to an identity type of the peer device; and a third sending module, configured to send the second control instruction to the target terminal according to the communication address information of the target terminal, so that the target terminal responds to the second control instruction according to the target logic response file.

Optionally, the data transmission apparatus embodiment applied to the server further includes:

a fourth receiving module, configured to receive a login status sent by the target terminal, the login status including a logged-in state and a logged-out state; and a fourth sending module, configured to send the login status to the peer device.

Optionally, there is a plurality of target terminals in the data transmission apparatus embodiment applied to the server, and the fourth sending module includes:

a calculation unit, configured to calculate the number of target terminals in the logged-in state according to the login statuses corresponding to the target terminals; and a sending unit, configured to send the login statuses corresponding to the target terminals and the number of target terminals in the logged-in state to the peer device.

Optionally, the data transmission apparatus embodiment applied to the server further includes:

an obtaining module, configured to obtain a target operation interface template corresponding to the target terminal from operation interface templates corresponding to the identity types; and a fifth sending module, configured to send the target operation interface template to the target terminal, so that the target terminal generates an operation interface according to the target operation interface template.

Optionally, before the identity token information sent by the target terminal is received, the data transmission apparatus embodiment applied to the server further includes:

a fifth receiving module, configured to receive a WebSocket connection establishment request sent by the target terminal, the WebSocket connection establishment request carrying identification information of the target terminal;

a second determining unit, configured to determine to establish a WebSocket connection with the target terminal and storing the WebSocket connection corresponding to the identification information of the target terminal, the WebSocket connection being a channel over which the target terminal and a server perform information exchange; and a sixth sending module, configured to return a WebSocket connection establishment completion message to the target terminal.

Figure 9:
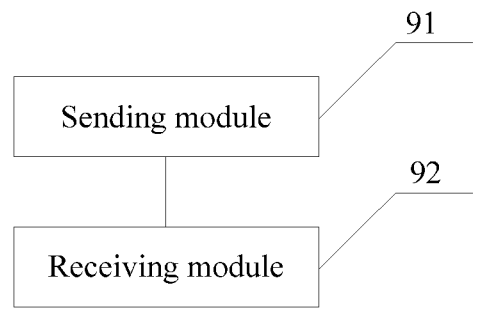
FIG. 9 is a schematic structural diagram of a data transmission apparatus applied to a terminal device according to an embodiment of this application.

As shown in FIG. 9, FIG. 9 is a schematic structural diagram of a data transmission apparatus applied to a terminal device according to an embodiment of this application. The apparatus includes a sending module 91 and a receiving module 92.

The sending module 91 is configured to send identity token information to a server, the identity token information being used for representing an identity type of the target terminal when the target terminal interacts with a peer device, the identity type being used for indicating that the target terminal is a control terminal or a presentation terminal.

The receiving module 92 is configured to receive a target logic response file fed back by the server and corresponding to the identity type of the terminal device.

The target logic response file includes response information corresponding to control instructions sent by the peer device and a correspondence between input information and a control instruction that the target terminal needs to send to the peer device, the response information is used for indicating an operation performed in response to the corresponding control instructions, and the input information is information received by the target terminal and used for controlling the peer device.

Optionally, the data transmission apparatus embodiment applied to the terminal device further includes:

a second receiving module, configured to receive target input information for controlling the peer device;

a first obtaining module, configured to obtain a first control instruction corresponding to the target input information according to the correspondence between the input information and the control instruction that the target terminal needs to send to the peer device; and a second sending module, configured to send the first control instruction to the peer device through the server.

Optionally, the data transmission apparatus embodiment applied to the terminal device further includes:

a third receiving module, configured to receive a second control instruction sent by the peer device;

a first determining module, configured to determine target response information corresponding to the second control instruction in the prestored response information corresponding to the control instructions sent by the peer device; and a first execution module, configured to perform a corresponding response operation according to the target response information.

Optionally, the data transmission apparatus embodiment applied to the terminal device further includes:

a fourth receiving module, configured to receive a target operation interface template that is fed back by the server, that is obtained according to prestored operation interface templates corresponding to identity types, and that corresponds to the identity type of the terminal device; and the first execution module is specifically configured to: generate according to the target response information and the target operation interface template, an operation interface that the terminal device currently needs to display.

Optionally, the data transmission apparatus embodiment applied to the terminal device further includes:

a third sending module, configured to send a WebSocket connection establishment request to the server; and a fifth receiving module, configured to receive a WebSocket connection establishment completion message fed back by the server, the WebSocket connection being a channel over which the terminal device and the server perform information exchange.

Optionally, the data transmission apparatus embodiment applied to the terminal device further includes:

a second determining module, configured to determine a current login status, the login status including a logged-in state and a logged-out state; and a fourth sending module, configured to send the login status to the peer device through the server.

Figure 10:
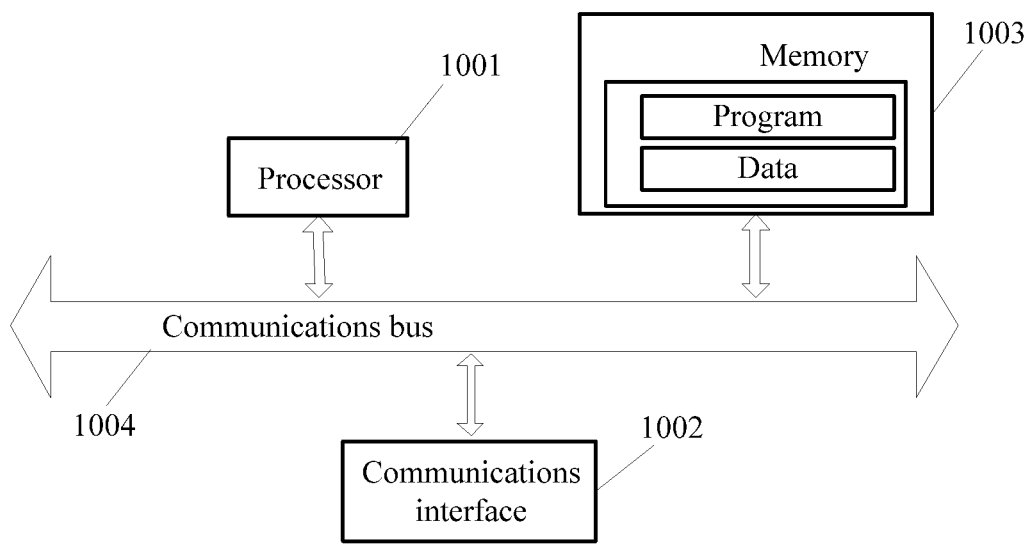
FIG. 10 is a block diagram of a hardware structure of a server having functions shown in FIG. 2 according to an embodiment of the present disclosure.

A block diagram of a hardware structure of a server having functions shown in FIG. 2 according to an embodiment of the present disclosure is shown in FIG. 10. Referring to FIG. 10, the server may include: a processor 1001, a communications interface 1002, a memory 1003, and a communications bus 1004.

Communication among the processor 1001, the communications interface 1002, and the memory 1003 is implemented through the communications bus 1004.

Optionally, the communication interface 1002 may be an interface of a communications module, for example, an interface of a GSM module.

The processor 1001 is configured to execute a program.

The memory 1003 is configured to store a program and data.

The program may include program code, and the program code includes a computer operating instruction.

The processor 1001 may be a central processing unit (CPU) or an application-specific integrated circuit (ASIC), or may be one or more integrated circuits configured to implement the embodiments of the present disclosure.

The memory 1003 may include a high-speed RAM memory, and may further include a non-volatile memory, for example, at least one magnetic disk memory.

The program may be specifically used for:

receiving identity token information sent by a target terminal, the identity token information being used for representing an identity type of the target terminal when the target terminal interacts with a peer device, the identity type being used for indicating that the target terminal is a control terminal or a presentation terminal;

determining a target logic response file corresponding to the identity type of the target terminal in logic response files corresponding to identity types, the target logic response file including response information corresponding to control instructions sent by the peer device and a correspondence between input information and a control instruction that the target terminal needs to send to the peer device, the response information being used for indicating an operation performed in response to the corresponding control instruction, and the input information being information received by the target terminal and used for controlling the peer device; and sending the target logic response file to the target terminal.

At last, it should be noted that the relational terms herein such as first and second are used only to differentiate an entity or operation from another entity or operation, and do not require or imply any actual relationship or sequence between these entities or operations. Moreover, the terms "include", "comprise", and any other variant thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, method, object, or device that includes the elements.

It should be noted that the embodiments in this specification are all described in a progressive manner. Description of each of the embodiments focuses on differences from other embodiments, and reference may be made to each other for the same or similar parts among respective embodiments.

The above descriptions of the disclosed embodiments make a person skilled in the art implement or use this application. Various modifications to these embodiments are obvious to a person skilled in the art, and the general principles defined in this specification may be implemented in other embodiments without departing from the spirit and scope of this application. Therefore, this application is not limited to these embodiments illustrated in this application, but needs to conform to the broadest scope consistent with the principles and novel features disclosed in this application.

What is claimed is:

1. A data transmission method performed at a server having one or more processors and memory storing a plurality of programs to be executed by the one or more processors, the method comprising:

receiving identity token information sent by a target terminal, the identity token information being used for representing an identity type of the target terminal when the target terminal interacts with a peer device, the identity type being used for indicating that the target terminal is a control terminal or a presentation terminal;

determining a target logic response file corresponding to the identity type of the target terminal in prestored logic response files corresponding to identity types, the target logic response file comprising response information corresponding to control instructions sent by the peer device and a correspondence between input information and a control instruction that the target terminal needs to send to the peer device, the response information being used for indicating an operation performed in response to the corresponding control instruction, and the input information being information received by the target terminal and used for controlling the peer device; and sending the target logic response file to the target terminal.

2. The data transmission method according to claim 1, wherein the determining a target logic response file corresponding to the identity type of the target terminal in prestored logic response files corresponding to identity types comprises:

determining a target port corresponding to the identity type of the target terminal in prestored ports corresponding to the identity types; and obtaining the target logic response file through the target port.

3. The data transmission method according to claim 1, further comprising:

receiving a first control instruction sent by the target terminal, the first control instruction carrying communication address information of the peer device; and sending the first control instruction to the peer device according to the communication address information of the peer device, so that the peer device responds to the first control instruction according to a logic response file corresponding to an identity type of the peer device.

4. The data transmission method according to claim 1, further comprising:
  receiving a second control instruction sent by the peer device, the second control instruction carrying communication address information of the target terminal, and the second control instruction being generated according to a logic response file corresponding to an identity type of the peer device; and
  sending the second control instruction to the target terminal according to the communication address information of the target terminal, so that the target terminal responds to the second control instruction according to the target logic response file.

5. The data transmission method according to claim 1, further comprising:
  receiving a login status sent by the target terminal, the login status comprising a logged-in state and a logged-out state; and
  sending the login status to the peer device.

6. The data transmission method according to claim 5, wherein there is a plurality of target terminals, and the sending the login status to the peer device comprises:
  calculating the number of target terminals in the logged-in state according to the login statuses corresponding to the target terminals; and
  sending the login statuses corresponding to the target terminals and the number of target terminals in the logged-in state to the peer device.

7. The data transmission method according to claim 1, further comprising:
  obtaining a target operation interface template corresponding to the target terminal from operation interface templates corresponding to the identity types; and
  sending the target operation interface template to the target terminal, so that the target terminal generates an operation interface according to the target operation interface template.

8. The data transmission method according to claim 1, before the receiving identity token information sent by a target terminal, further comprising:
  receiving a WebSocket connection establishment request sent by the target terminal, the WebSocket connection establishment request carrying identification information of the target terminal;
  determining to establish a WebSocket connection with the target terminal and storing the WebSocket connection corresponding to the identification information of the target terminal, the WebSocket connection being a channel over which the target terminal and a server perform information exchange; and
  returning a WebSocket connection establishment completion message to the target terminal.

9. A server comprising: one or more processors, memory, and a plurality of machine readable instructions stored in the memory, wherein the plurality of machine readable instructions, when executed by the one or more processors, cause the server to perform a plurality of operations comprising:
  receiving identity token information sent by a target terminal, the identity token information being used for representing an identity type of the target terminal when the target terminal interacts with a peer device, the identity type being used for indicating that the target terminal is a control terminal or a presentation terminal;
  determining a target logic response file corresponding to the identity type of the target terminal in prestored logic response files corresponding to identity types, the target logic response file comprising response information corresponding to control instructions sent by the peer device and a correspondence between input information and a control instruction that the target terminal needs to send to the peer device, the response information being used for indicating an operation performed in response to the corresponding control instruction, and the input information being information received by the target terminal and used for controlling the peer device; and
  sending the target logic response file to the target terminal.

10. The server according to claim 9, wherein the determining a target logic response file corresponding to the identity type of the target terminal in prestored logic response files corresponding to identity types comprises:
  determining a target port corresponding to the identity type of the target terminal in prestored ports corresponding to the identity types; and
  obtaining the target logic response file through the target port.

11. The server according to claim 9, wherein the plurality of operations further comprise:
  receiving a first control instruction sent by the target terminal, the first control instruction carrying communication address information of the peer device; and
  sending the first control instruction to the peer device according to the communication address information of the peer device, so that the peer device responds to the first control instruction according to a logic response file corresponding to an identity type of the peer device.

12. The server according to claim 9, wherein the plurality of operations further comprise:
  receiving a second control instruction sent by the peer device, the second control instruction carrying communication address information of the target terminal, and the second control instruction being generated according to a logic response file corresponding to an identity type of the peer device; and
  sending the second control instruction to the target terminal according to the communication address information of the target terminal, so that the target terminal responds to the second control instruction according to the target logic response file.

13. The server according to claim 9, wherein the plurality of operations further comprise:
  receiving a login status sent by the target terminal, the login status comprising a logged-in state and a logged-out state; and
  sending the login status to the peer device.

14. The server according to claim 13, wherein there is a plurality of target terminals, and the sending the login status to the peer device comprises:
  calculating the number of target terminals in the logged-in state according to the login statuses corresponding to the target terminals; and
  sending the login statuses corresponding to the target terminals and the number of target terminals in the logged-in state to the peer device.

15. The server according to claim 9, wherein the plurality of operations further comprise:
  obtaining a target operation interface template corresponding to the target terminal from operation interface templates corresponding to the identity types; and
  sending the target operation interface template to the target terminal, so that the target terminal generates an operation interface according to the target operation interface template.

16. The server according to claim 9, wherein the plurality of operations further comprise:

before receiving the identity token information sent by the target terminal:
receiving a WebSocket connection establishment request sent by the target terminal, the WebSocket connection establishment request carrying identification information of the target terminal;
determining to establish a WebSocket connection with the target terminal and storing the WebSocket connection corresponding to the identification information of the target terminal, the WebSocket connection being a channel over which the target terminal and a server perform information exchange; and
returning a WebSocket connection establishment completion message to the target terminal.

17. A non-transitory computer readable storage medium storing a plurality of machine readable instructions in connection with a server having one or more processors, wherein the plurality of machine readable instructions, when executed by the one or more processors, cause the server to perform a plurality of operations including:

receiving identity token information sent by a target terminal, the identity token information being used for representing an identity type of the target terminal when the target terminal interacts with a peer device, the identity type being used for indicating that the target terminal is a control terminal or a presentation terminal;
determining a target logic response file corresponding to the identity type of the target terminal in prestored logic response files corresponding to identity types, the target logic response file comprising response information corresponding to control instructions sent by the peer device and a correspondence between input information and a control instruction that the target terminal needs to send to the peer device, the response information being used for indicating an operation performed in response to the corresponding control instruction, and the input information being information received by the target terminal and used for controlling the peer device; and
sending the target logic response file to the target terminal.

18. The non-transitory computer readable storage medium according to claim 17, wherein the determining a target logic response file corresponding to the identity type of the target terminal in prestored logic response files corresponding to identity types comprises:

determining a target port corresponding to the identity type of the target terminal in prestored ports corresponding to the identity types; and
obtaining the target logic response file through the target port.

19. The non-transitory computer readable storage medium according to claim 17, wherein the plurality of operations further comprise:

receiving a first control instruction sent by the target terminal, the first control instruction carrying communication address information of the peer device; and
sending the first control instruction to the peer device according to the communication address information of the peer device, so that the peer device responds to the first control instruction according to a logic response file corresponding to an identity type of the peer device.

20. The non-transitory computer readable storage medium according to claim 17, wherein the plurality of operations further comprise:

receiving a second control instruction sent by the peer device, the second control instruction carrying communication address information of the target terminal, and the second control instruction being generated according to a logic response file corresponding to an identity type of the peer device; and
sending the second control instruction to the target terminal according to the communication address information of the target terminal, so that the target terminal responds to the second control instruction according to the target logic response file.

* * * * *